US006835149B2

(12) United States Patent
Konno et al.

(10) Patent No.: US 6,835,149 B2
(45) Date of Patent: Dec. 28, 2004

(54) TENSIONER LEVER FOR TRANSMITTING MEDIUM

(75) Inventors: Masahiko Konno, Osaka (JP); Toshifumi Satoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 97 days.

(21) Appl. No.: 10/349,657

(22) Filed: Jan. 23, 2003

(65) Prior Publication Data
US 2003/0144101 A1 Jul. 31, 2003

(30) Foreign Application Priority Data
Jan. 31, 2002 (JP) ......................... 2002-024357

(51) Int. Cl.$^7$ .............................. F16H 7/08; F16H 7/18
(52) U.S. Cl. ...................................................... 474/111
(58) Field of Search ................................ 474/111, 140, 474/110, 109; 267/158, 260

(56) References Cited

U.S. PATENT DOCUMENTS 5,266,066 A * 11/1993 White ........................ 474/111
5,425,680 A * 6/1995 Young ........................ 474/111
5,984,815 A * 11/1999 Baddaria .................... 474/111
6,572,502 B1 * 6/2003 Young et al. ............... 474/111
6,620,067 B1 * 9/2003 Nakamura et al. .......... 474/111
6,623,391 B2 * 9/2003 Young et al. ............... 474/111

FOREIGN PATENT DOCUMENTS

JP          3253951        11/2001
WO        WO 0138757 A     5/2001

* cited by examiner

Primary Examiner—Marcus Charles
(74) Attorney, Agent, or Firm—Howson and Howson

(57) ABSTRACT

A tensioner lever for an engine timing chain comprises a synthetic resin lever body including a shoe having a chain-contacting sliding surface, and a spring-receiving portion on the back of a shoe. A laminated sheet spring is fitted into a slot formed in the spring-receiving portion along the longitudinal direction of the lever. The synthetic resin lever body is pivoted on a pivot shaft mounted on an engine, and an end of the laminated sheet spring is locked into a groove in the pivot shaft so that the spring can be stressed and thereby exert a tensioning force on the chain through the tensioner lever.

4 Claims, 7 Drawing Sheets

TENSIONER LEVER FOR TRANSMITTING MEDIUM

CROSS-REFERENCE TO RELATED APPLICATION

This application claims priority from Japanese application 024357/2002, filed Jan. 31, 2002.

FIELD OF THE INVENTION

This invention relates to a tensioner lever for maintaining tension in a flexible, circulating, power transmission medium such as a chain or belt used to transmit power from a driving sprocket or pulley to one or more driven sprockets or pulleys.

BACKGROUND OF THE INVENTION

As shown in FIG. 9, a chain or belt transmission device for valve timing in an internal combustion engine, or for transmitting rotational power in another drive mechanism, includes a chain or belt C, which transmits power from a driving sprocket or pulley S1 to one or more driven sprockets or pulleys S2. The transmission includes a pivotally mounted, movable, sliding contact guide Ga, which cooperates with a tensioner, and a fixed sliding contact guide Gb. The movable guide and the fixed guide are attached to a frame E of the engine or other drive mechanism by suitable pins P or by bolts, or similar mountings. The movable guide Ga cooperates with a tensioner T, and makes sliding contact with the chain or belt C, controlling tension therein. The fixed guide Gb prevents vibration of the chain or belt both in the plane of its traveling path (which is usually vertical), and in the transverse direction.

FIG. 10 shows a movable guide 500, as disclosed in the specification of Japanese patent application No. 2000-382798. The guide comprises a guide body 510, which includes a shoe on the surface of which a traveling chain slides. The guide body also includes a plate-receiving portion 512 on the back of the shoe 511. This plate-receiving portion extends along the longitudinal direction of the guide, and the shoe and plate-receiving portion are integrally molded as a unit from a synthetic resin. A reinforcing plate 520, for reinforcing the guide body 510, is fitted into a slot 512a formed along an edge of the plate-receiving portion 512 and extending along the longitudinal direction of the guide.

A mounting hole 512b is provided in a boss 512d formed on the guide body 510 adjacent an end thereof, for pivotally mounting the guide on a mounting surface of an engine by means of a pivot such as a mounting pin P (FIG. 9) or the like. A hole 521 in the reinforcing plate 520. A tensioner contact portion 512c is provided adjacent the other end of the guide for engagement with the plunger of a tensioner T (FIG. 9), mounted on the frame of engine E.

The conventional movable guide requires a tensioner T mounted on a mounting surface of the engine frame as a separate member. Moreover, the tensioner T incorporates a complicated mechanical or hydraulic plunger-operating mechanism typically having a number of parts, and contributes to the overall weight of the tensioning mechanism, and requires a significant amount of mounting space. Contact between the guide and the plunger of the tensioner also produces contact noise and vibration noise.

Accordingly, objects of the invention are to solve the above-mentioned problems of the prior art, and to provide a tensioner lever which promotes stable and quiet operation of a flexible transmission medium, which obviates the use of a separate tensioner, which is compact in size, and which contributes to a reduction in the overall cost of a transmission device.

SUMMARY OF THE INVENTION

The tensioner lever in accordance with the invention comprises a synthetic resin lever body having an elongated shoe. The shoe has a surface for sliding engagement with a transmission medium. A spring-receiving portion is provided on the back side of the shoe, and extends along the longitudinal direction of the shoe. The spring-receiving portion has a slot, also extending along the longitudinal direction of the shoe and having an opening facing away from the shoe. A laminated sheet spring is fitted into the slot. A shaft fixed to a mounting frame is received in a mounting hole in the lever body, and the lever body is pivotable about the axis of the shaft. A proximal end of the spring is received and held in a groove formed in the shaft and extending in the axial direction. Consequently, the spring can be placed under strain by pivoting the lever about the shaft axis from a position in which the spring is relaxed, so that a reaction force exerted by the spring on the lever body can cause the lever to exert a tensioning force on a power transmission medium engaged with the surface of the shoe.

In a preferred embodiment a plurality of spring-dislodgement-preventing hooks are disposed on the spring-receiving portion of the lever at intervals along the longitudinal direction to hold the laminated sheet spring in the slot.

The materials of the synthetic resin lever bodies in the invention are not especially limited. However engineering plastics having superior wear resistance and lubricating properties, such as nylon 6, nylon 66, nylon 46, all aromatic nylons and the like are preferred, since the lever body has a surface functioning as a shoe, on which a transmission medium such as a chain, belt or the like slides. Where bending rigidity, toughness, or strength are required fiber-reinforced plastics are preferred.

The materials of the laminated sheet spring are likewise not especially limited, provided that they exhibit spring properties. Iron-based metals, or non-ferrous metals such as aluminum, magnesium, titanium and the like, can be used. The proximal end of the laminated spring is preferably in the form of a spiral, but other shapes may be used so long as the proximal end can be locked onto a groove in the pivot shaft.

The tensioner lever suppresses vibration in the traveling direction of the transmitting medium as well as widthwise vibration, and the synthetic resin lever body is uniformly supported by the entire laminated sheet spring with respect to the synthetic resin lever body without being biased in the longitudinal direction or in the direction of the width of the lever.

The locking of the spring into the spring locking groove of the pivot shaft allows the spring to exert a tensioning force on the shoe, pushing it against the transmission medium. Accordingly, the tensioner lever applies tension, avoiding loosening of the transmission medium, and thereby ensuring reliable power transmission.

The spring-dislodgement-preventing hooks disposed along the longitudinal direction of the lever hold the laminated sheet spring. Accordingly, spring is prevented from becoming dislodged from the tensioner lever, yet the tensioner lever is able to absorb stress in its longitudinal direction.

DETAILED DESCRIPTION OF THE PREFERRED EMBODIMENT

Figure 1:
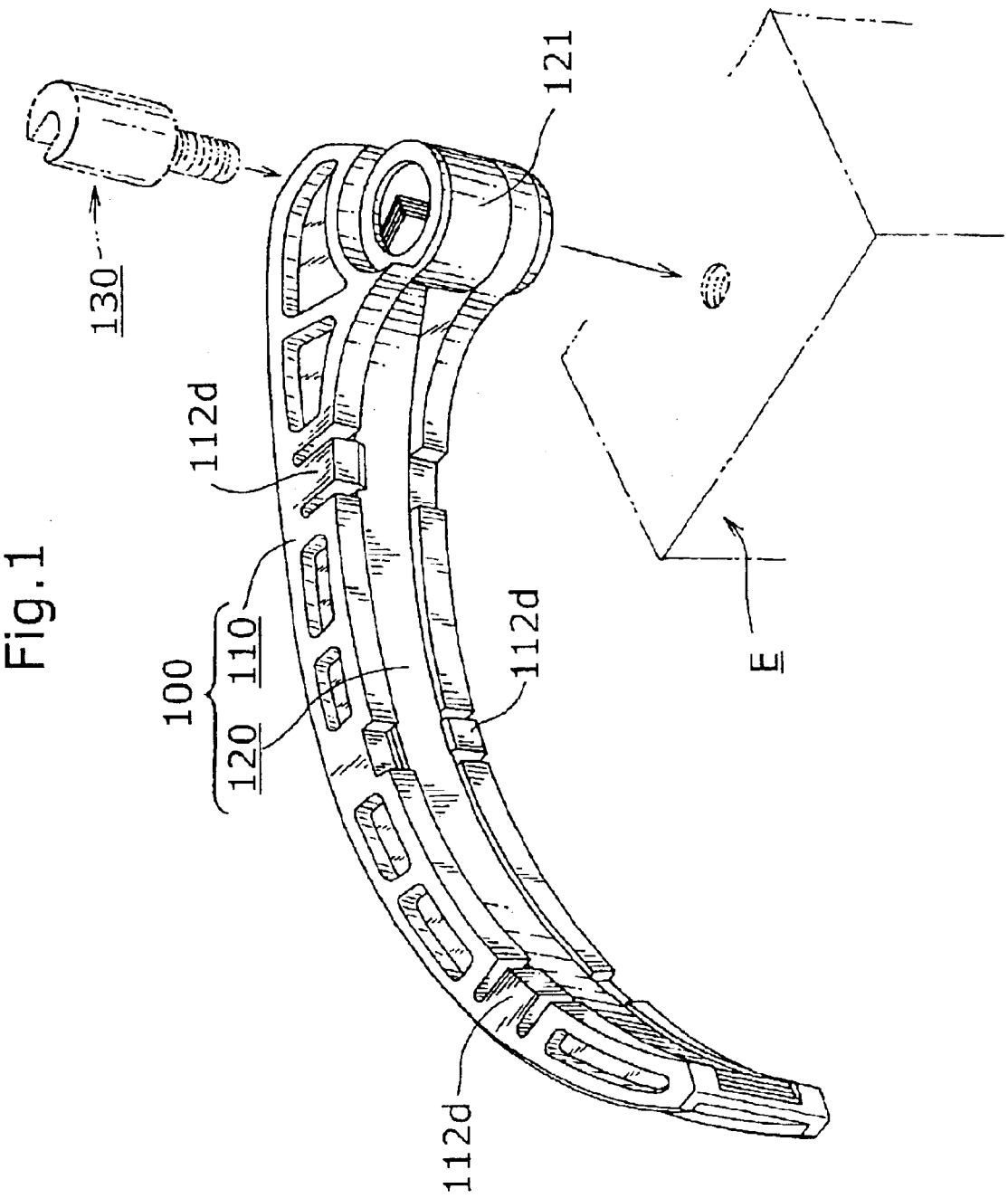
FIG. 1 is an exploded perspective view showing the exterior of a tensioner lever in accordance with the invention, with the laminated spring in place in the lever body, but with the pivot shaft removed.
Figure 2:
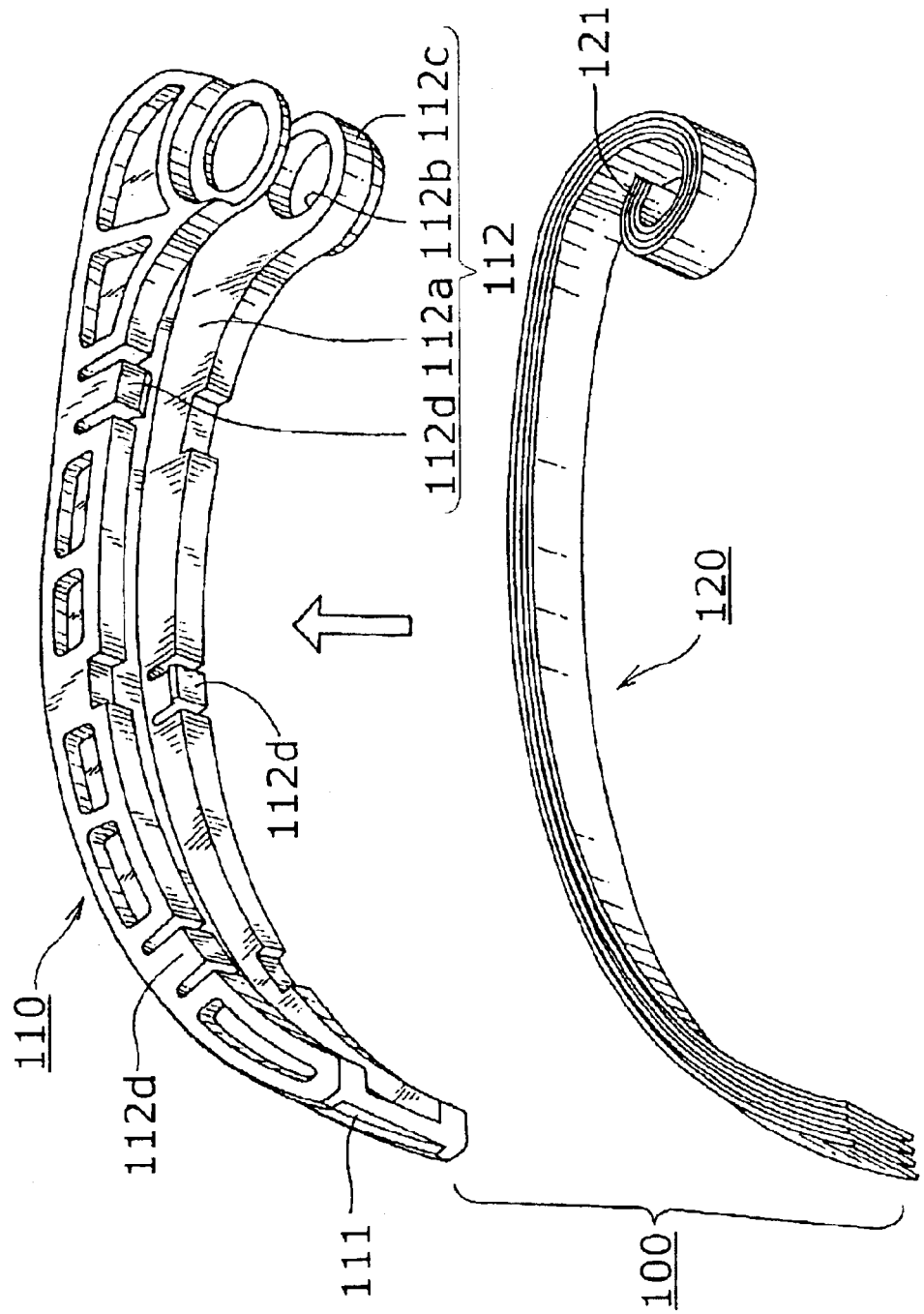
FIG. 2 is an exploded perspective view showing the exterior of a tensioner lever in accordance with the invention, with the laminated spring removed from the lever body.

The tensioner lever 100, shown in FIG. 1, can be incorporated in an engine for controlling tension in a circulating chain which travels in sliding contact on the lever. The lever 100 is an elongated, two-piece structure comprising a synthetic resin lever body 110 integrally molded as a unit, and a metallic laminated sheet spring 120, as shown in FIG. 2. The tensioner lever 100 is assembled by incorporating the laminated sheet spring 120 into to the synthetic resin lever body 110 in the direction of the arrow in FIG. 2.

The lever body 110 comprises a shoe 111 having a chain-contacting surface on which a chain can slide, and a spring-receiving portion 112 on the back of the shoe 111, and extending along the longitudinal direction of the lever. The spring-receiving portion 112 is provided with a slot 112a, the opening of which faces away from the shoe. This slot also extends along the longitudinal direction of the lever. The lever body has a boss 112c adjacent one of its ends, with a mounting hole 112b in the boss for mounting the lever on a pivot shaft 130 fixed to an engine E. The lever body has plurality of spring-dislodgement-preventing hooks 112d arranged along the slot opening at intervals in the longitudinal direction of the lever. The shoe 111 of the lever body 110 may be brought into sliding contact with a traveling chain to suppresses vibration in the traveling direction of the chain as well as widthwise vibration.

Since the lever body 110 holds the spring 120 by plurality of spring-dislodgement-preventing hooks 112d, the lever body can absorb strain in the longitudinal direction. Therefore, the assembled lever can be mounted without having the lever body become dislodged from the spring. Furthermore, even though the spring and the lever body may have significantly different coefficients of thermal expansion, the lever is free to expand and contract in the longitudinal direction of the lever, so that deformation and breakage of the lever are avoided.

As shown in FIG. 2, the spring 120 is composed of individual sheets of spring material arranged one on another, and the transverse width of the laminated sheet spring 120 is small. The spring include a spiral proximal portion 121, which is secured to a pivot shaft 130, in such a way as to allow a bending stress to be applied to the spring. By fitting the laminated sheet spring 120 into the slot 112a formed in the plate-receiving portion on the back side of the shoe 111, the synthetic resin lever body 110 is reinforced along the length of the lever. The spring 120 uniformly supports the synthetic resin lever body 110 without biasing the lever body in the longitudinal and widthwise directions. The support afforded by the spring is distributed over a lever-engaging face of the spring, which extending along almost the entire length of the lever, thereby avoiding wear due to stress concentration.

Figure 3:
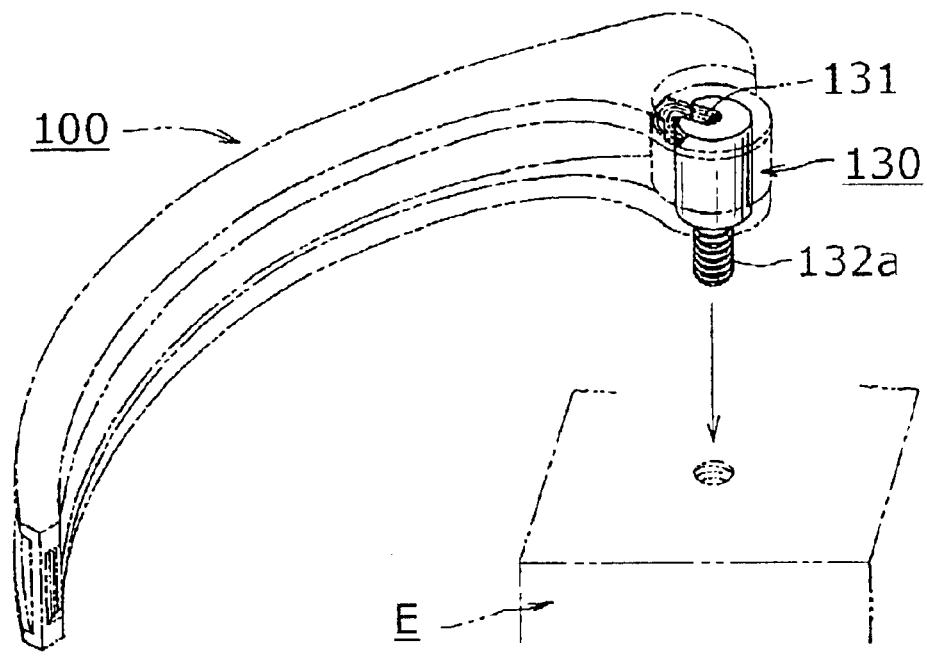
FIG. 3 is a perspective view of showing how the pivot shaft is incorporated into the tensioner lever.
Figure 4:
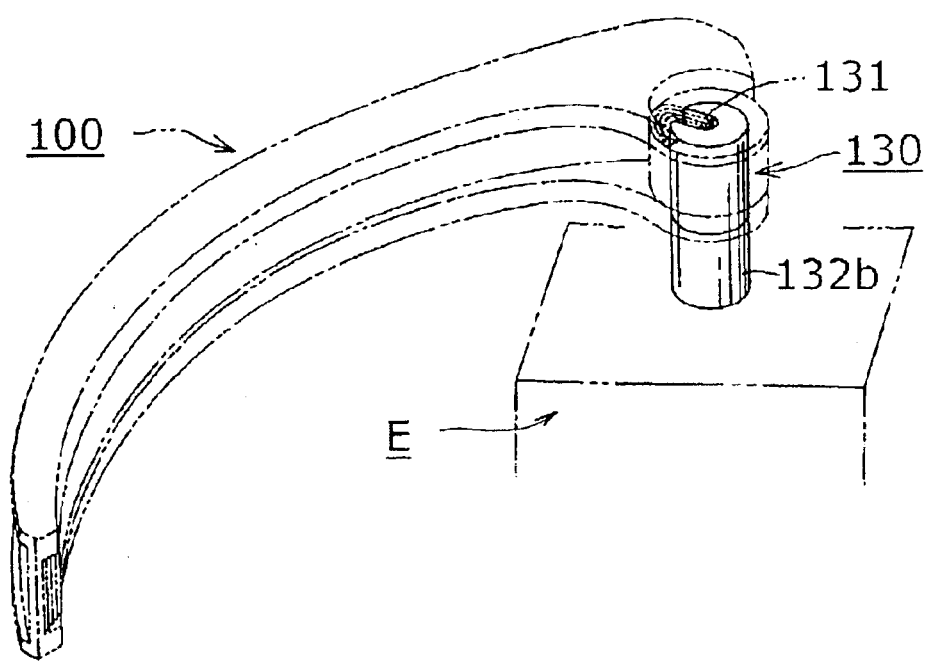
FIG. 4 is a perspective view of showing how an alternative pivot shaft incorporated into the tensioner lever.

The pivot shaft 130 has a spring-receiving groove 131, extending in the axial direction of the pivot shaft, as shown in FIGS. 3 and 4. The end of the spiral, proximal portion 121 of the laminated sheet spring 120 is locked in the spring receiving groove 131. The shaft may be secured to the engine E by a threaded portion 132a as shown in FIG. 3, or by press-fitting a portion 132b of the shaft into the engine as shown in FIG. 4.

A radial, dislodgement-preventing pin insertion hole, (not shown) for preventing the tensioner lever 100 from becoming dislodged from the pivot shaft 130, may be provided on the other side of the pivot shaft 130.

The steps of mounting the tensioner lever 100 on an engine E are shown in FIGS. 1, 2, and 5 to 8.

Figure 5:
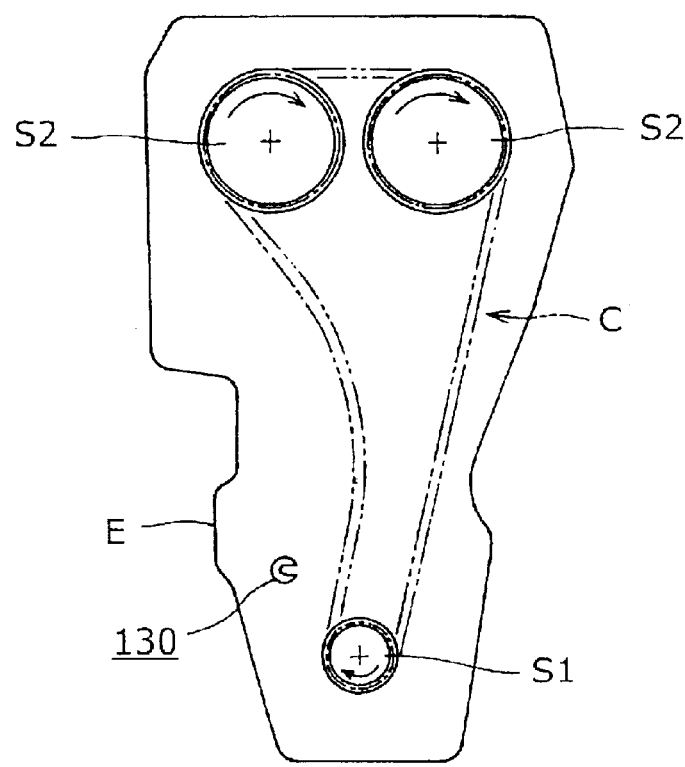
FIG. 5 is a schematic elevational view of the timing drive of an internal combustion engine, illustrating the position of the pivot shaft.
Figure 6:
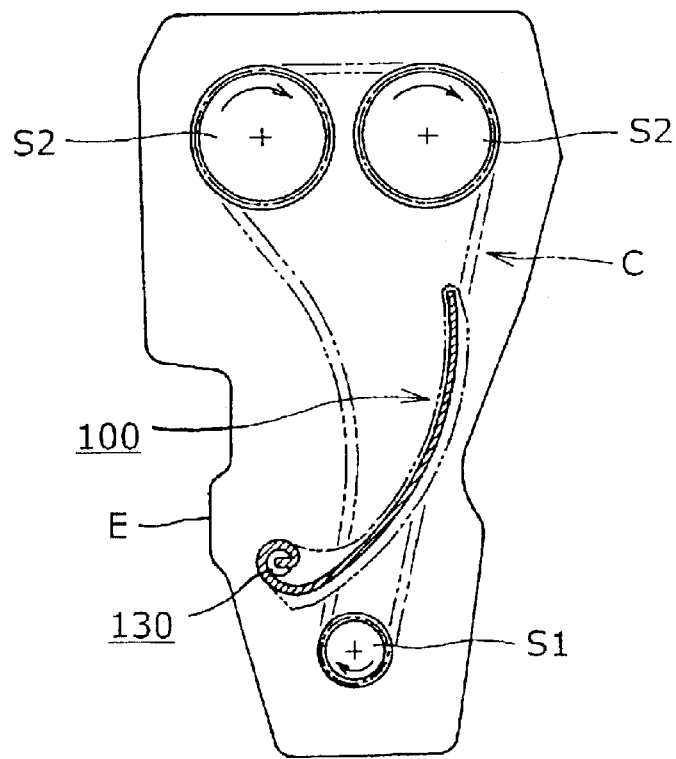
FIG. 6 is a schematic elevational view showing the position of the tensioner lever when it is inserted into an engine frame.

First, the pivot shaft 130 is fixed to the engine with its spring-receiving groove oriented in the direction shown in FIG. 5. Then, the spring is inserted into the lever body as shown in FIG. 2 to produce the lever assembly shown in FIG. 1. With the spring and lever body assembled as shown in FIG. 1, the mounting hole 112 of the lever body is fitted onto the pivot shaft 130, while the end of the spiral proximal portion 121 of the spring 120 is inserted into the spring locking groove 131 as shown in FIG. 6. In the position shown in FIG. 6, the spring is in its relaxed (unstressed) condition.

Figure 7:
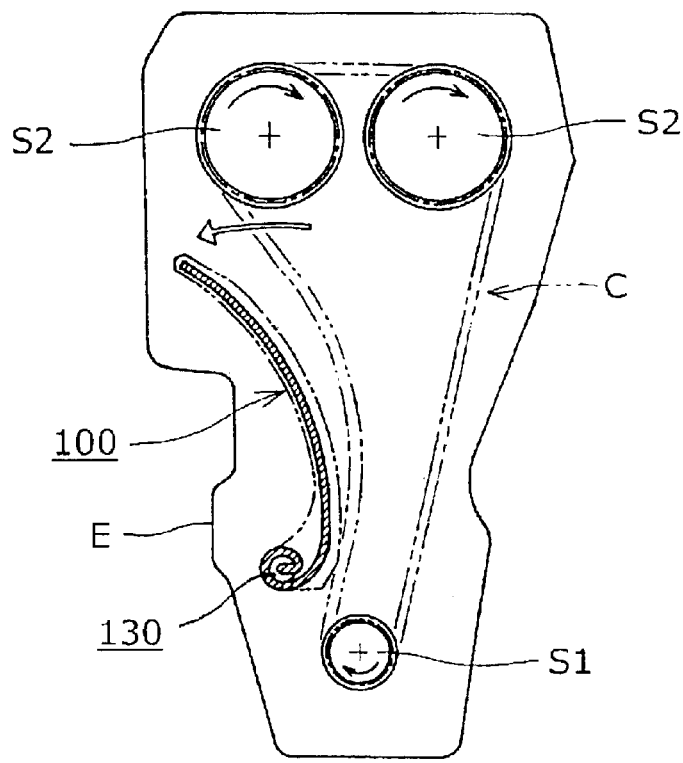
FIG. 7 is a schematic elevational view showing the tensioner lever in a condition in which stress is applied to the spring therein.
Figure 8:
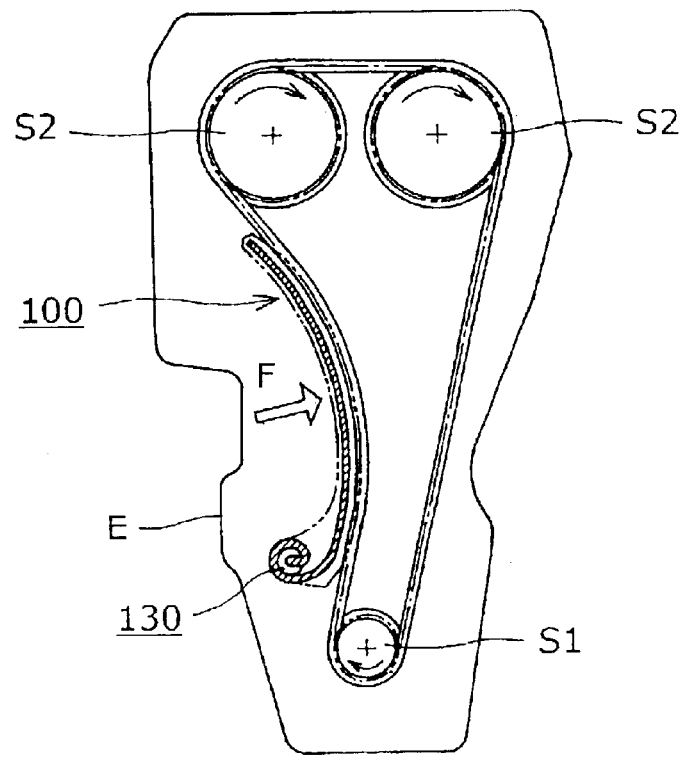
FIG. 8 is a schematic elevational view showing the tensioner lever brought into contact with a transmission medium.
Figure 9:
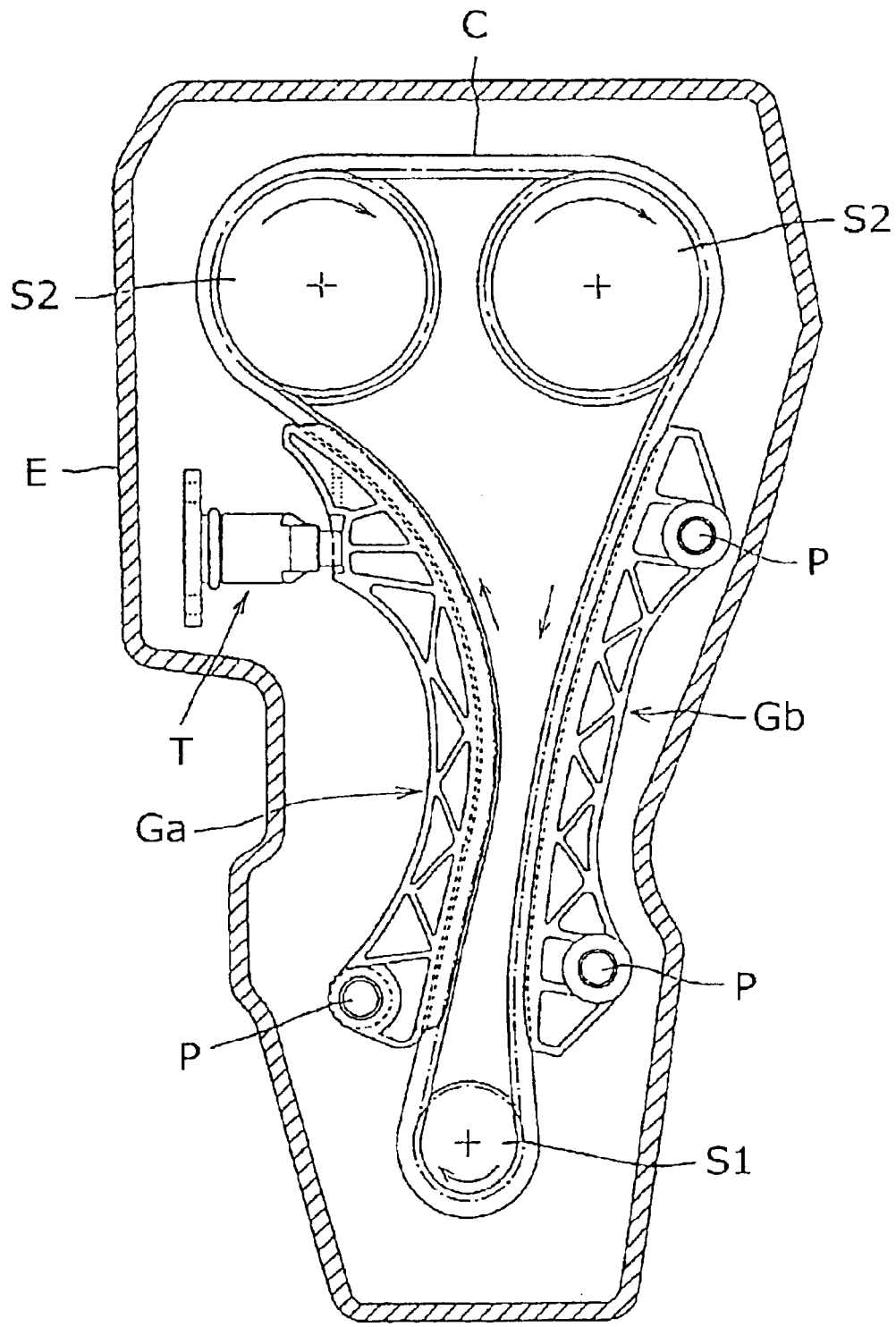
FIG. 9 is an elevational view of the timing transmission in an internal combustion engine, incorporating a conventional movable guide.
Figure 10:
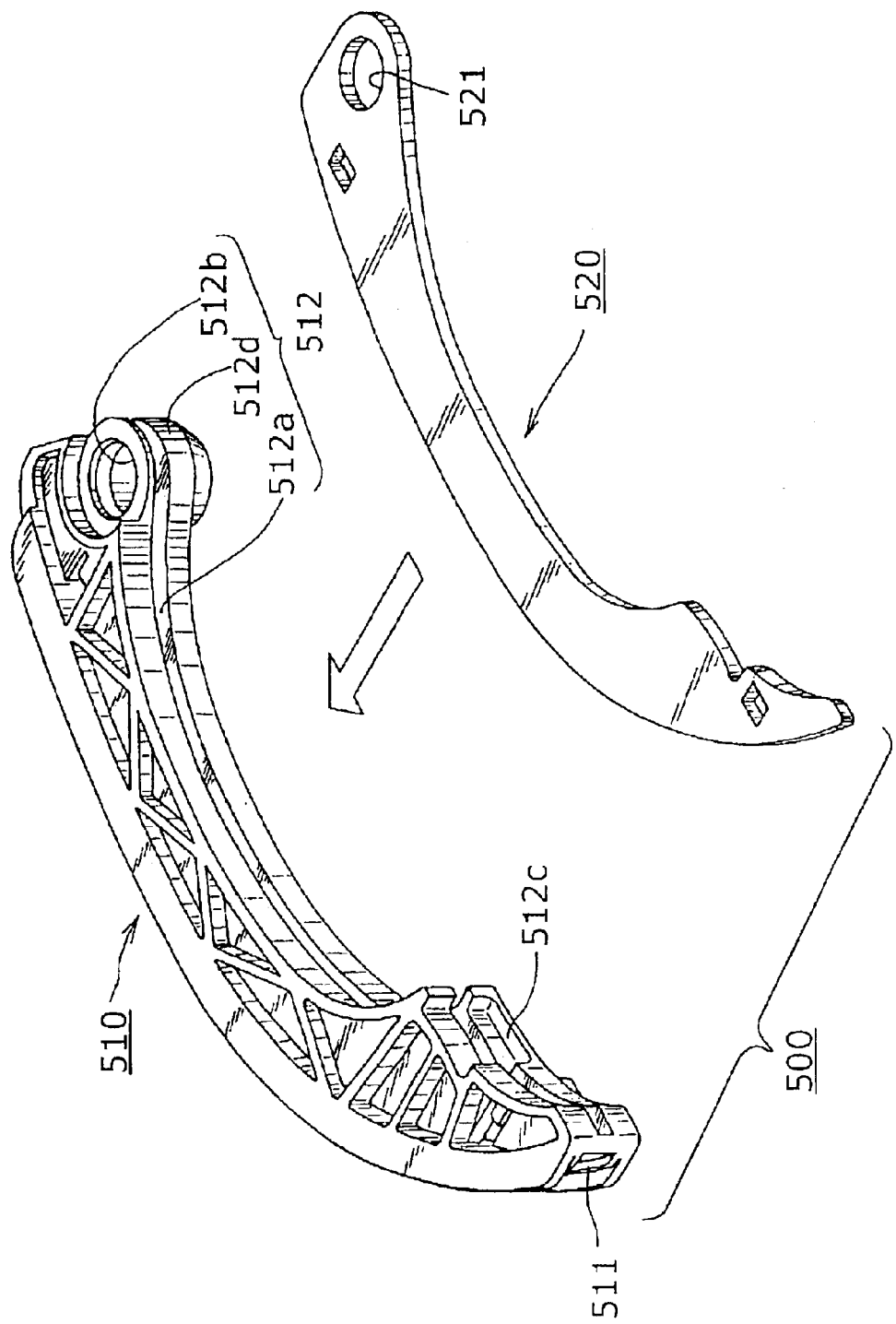
FIG. 10 is an exploded perspective view of the conventional movable guide.

As shown in FIG. 7, the lever is pivoted, in the direction of the arrow, at least to a position beyond the outside of the chain path (depicted by broken lines). The pivoting motion depicted in FIG. 7 exerts a bending stress on the spring. The chain C is then installed on the sprockets S1 and S2, as shown in FIG. 8, and the lever 100 is brought into contact with the chain, whereby, as a result of the strain in the spring 120, the spring exerts a force F against the chain, applying tension to, and preventing loosening of, the chain.

The tensioner lever 100 described above ensures stable travel of a transmission chain C by applying tension thereto without the use of a tensioner T, and also achieves quiet operation by eliminating the contact noise and vibration noise which are produced by tensioning mechanisms incorporating movable guides cooperating with tensioners having plungers. The tensioner lever 100 in accordance with the invention requires fewer parts, and is more compact and less expensive than conventional tensioning mechanisms.

Both vibration in the traveling direction of a transmission medium, and transverse vibration, are suppressed, and stable longitudinal traveling of the chain without widthwise movement, can be attained without the use of a separate, conventional tensioner.

Furthermore, the spring-dislodgement-preventing hooks prevent the laminated sheet spring from becoming dislodged from the lever body during attachment of the lever to a transmission device, while allowing the lever to absorb stress in the longitudinal direction during operation, and permit relative thermal expansion and contraction of the lever body and spring, especially under the high temperature conditions encountered in an engine, thereby avoiding shape deformation and breakage.

We claim:

1. A tensioner lever for a flexible power transmission medium comprising a synthetic resin lever body having an elongated shoe, said shoe having a first surface for sliding engagement with a transmission medium and a back side opposite said first surface, and a spring-receiving portion on said back side of the shoe and extending along the longitudinal direction of the shoe, said spring receiving portion having a slot, also extending along the longitudinal direction of the shoe, the slot having an opening facing away from the shoe, a laminated sheet spring fitted into said slot, a mounting frame, a shaft fixed to said mounting frame and extending along an axis, a mounting hole in said lever body receiving said shaft, the lever body being pivotable about said axis, a groove formed in said shaft said groove extending in the axial direction of said shaft, said spring having a proximal end received and held in said groove, whereby said spring can be placed under strain by pivoting the lever about said axis from a position in which said spring is relaxed, so that a reaction force exerted by the spring on the lever body can cause the lever to exert a tensioning force on a power transmission medium.

2. A tensioner lever according to claim 1, in which said synthetic resin lever body includes a plurality of spring-dislodgement-preventing hooks disposed on said spring-receiving portion at intervals along the longitudinal direction of the lever, said hooks holding said laminated sheet spring in said slot.

3. A power transmission comprising, a flexible power transmission medium, and a tensioner lever engaged with said flexible power transmission medium, the tensioner lever comprising a synthetic resin lever body having an elongated shoe, said shoe having a first surface in sliding engagement with said transmission medium and a back side opposite said first surface, and a spring-receiving portion on said back side of the shoe and extending along the longitudinal direction of the shoe, said spring receiving portion having a slot, also extending along the longitudinal direction of the shoe, the slot having an opening facing away from the shoe, a laminated sheet spring fitted into said slot, a mounting frame, a shaft fixed to said mounting frame and extending along an axis, a mounting hole in said lever body receiving said shaft, the lever body being pivotable about said axis, a groove formed in said shaft said groove extending in the axial direction of said shaft, said spring having a proximal end received and held in said groove, said spring being under strain and exerting a reaction force on the lever body causing the lever to exert a tensioning force on said power transmission medium.

4. A power transmission according to claim 3, in which said synthetic resin lever body includes a plurality of spring-dislodgement-preventing hooks disposed on said spring-receiving portion at intervals along the longitudinal direction of the lever, said hooks holding said laminated sheet spring in said slot.

* * * * *